United States Patent
Robinson et al.

(10) Patent No.: US 9,258,405 B1
(45) Date of Patent: Feb. 9, 2016

(54) MEETING INTEGRATION FOR A MESSAGING AND SCHEDULING APPLICATION

(75) Inventors: Tony Robinson, Palo Alto, CA (US); James Fulker, Palo Alto, CA (US); Paul Hangas, San Jose, CA (US)

(73) Assignee: GOOD TECHNOLOGY SOFTWARE, INC., Wilmington, DE (US)

(*) Notice: Subject to any disclaimer, the term of this patent is extended or adjusted under 35 U.S.C. 154(b) by 554 days.

(21) Appl. No.: 11/642,363

(22) Filed: Dec. 18, 2006

(51) Int. Cl.
*G06F 15/16* (2006.01)
*H04M 1/725* (2006.01)
*G06F 3/041* (2006.01)

(52) U.S. Cl.
CPC ........... *H04M 1/72552* (2013.01); *G06F 3/041* (2013.01)

(58) Field of Classification Search
USPC .................................. 709/204–207; 715/733
See application file for complete search history.

(56) References Cited

U.S. PATENT DOCUMENTS

| | | | |
|---|---|---|---|
| 7,084,758 B1* | 8/2006 | Cole | 340/539.11 |
| 2003/0126300 A1* | 7/2003 | Pickover et al. | 709/310 |
| 2003/0182383 A1 | 9/2003 | He | |
| 2005/0076110 A1* | 4/2005 | Mathew et al. | 709/223 |
| 2005/0091095 A1* | 4/2005 | Wilbrink et al. | 705/8 |
| 2005/0216421 A1 | 9/2005 | Barry et al. | |
| 2005/0251558 A1* | 11/2005 | Zaki | 709/206 |
| 2006/0168074 A1 | 7/2006 | Gardner et al. | |
| 2006/0248183 A1* | 11/2006 | Barton | 709/224 |
| 2007/0177584 A1 | 8/2007 | Kubler et al. | |

FOREIGN PATENT DOCUMENTS

| | | |
|---|---|---|
| EP | 1079652 A1 | 2/2001 |
| EP | 1713293 A1 | 10/2006 |
| WO | 2007033236 A2 | 3/2007 |
| WO | 2009061796 A1 | 5/2009 |

* cited by examiner

*Primary Examiner* — Mohamed Ibrahim
(74) *Attorney, Agent, or Firm* — EIP US LLP

(57) ABSTRACT

A method and apparatus for meeting integration for scheduling and message application are disclosed. The method includes: inserting a reminder entry into an inbox of a messaging portion of an application, the reminder entry to indicate an upcoming occurrence of an event scheduled in a scheduling portion of the application; and persisting the reminder entry in the inbox for a predetermined amount of time including throughout a duration of the event. Other embodiments are also disclosed.

21 Claims, 4 Drawing Sheets

MEETING INTEGRATION FOR A MESSAGING AND SCHEDULING APPLICATION

FIELD OF THE INVENTION

This invention relates generally to the field of messaging and scheduling applications for computing devices. More particularly, the invention relates to a meeting integration for a messaging and scheduling application.

BACKGROUND

A variety of wireless data processing devices have been introduced over the past several years. These include wireless personal digital assistants ("PDAs") such as the Palm® VIIx handheld, cellular phones equipped with data processing capabilities (e.g., those which include wireless application protocol ("WAP") support), and, more recently, wireless messaging devices such as the Blackberry™ wireless pager developed by Research In Motion ("RIM™").

In implementing features into a wireless messaging device, many times the features are based on a current implementation of state of the art applications. However, in many cases, improvements can be made over the current state of the art implementation.

In current messaging and scheduling applications, such as Microsoft Outlook™ or Lotus Notes™, when a meeting or other event is to occur in the calendar, a pop-up reminder is delivered to the user of the application to inform them of an upcoming meeting or event. This reminder may show up at some pre-determined amount of time prior to the meeting or event. The user then may either dismiss the pop-up reminder or ask it to remind the user again at a later time (i.e., "snooze").

A problem with the pop-up reminder is that the user must immediately decide how to dispose of the reminder. Once the user makes their determination the reminder is gone. The only way to access the information associated with the reminder is to navigate to the calendar in the scheduling portion of the application and find the relevant meeting or event entry to determine any details the user seeks. On a wireless device, where screen real estate is at a premium, such cumbersome navigation can be time-consuming and inefficient.

BRIEF DESCRIPTION OF THE DRAWINGS

A better understanding of the present invention can be obtained from the following detailed description in conjunction with the following drawings, in which.

DETAILED DESCRIPTION

According to one embodiment, a mechanism for meeting integration for a messaging and scheduling application is disclosed. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout the following description, reference may be made to embodiments of the invention being located and performed in a wireless messaging device. However, one skilled in the art will appreciate that embodiments of the invention may be located and operate on any general computing device and are not necessarily limited to a wireless messaging device.

Figure 1:
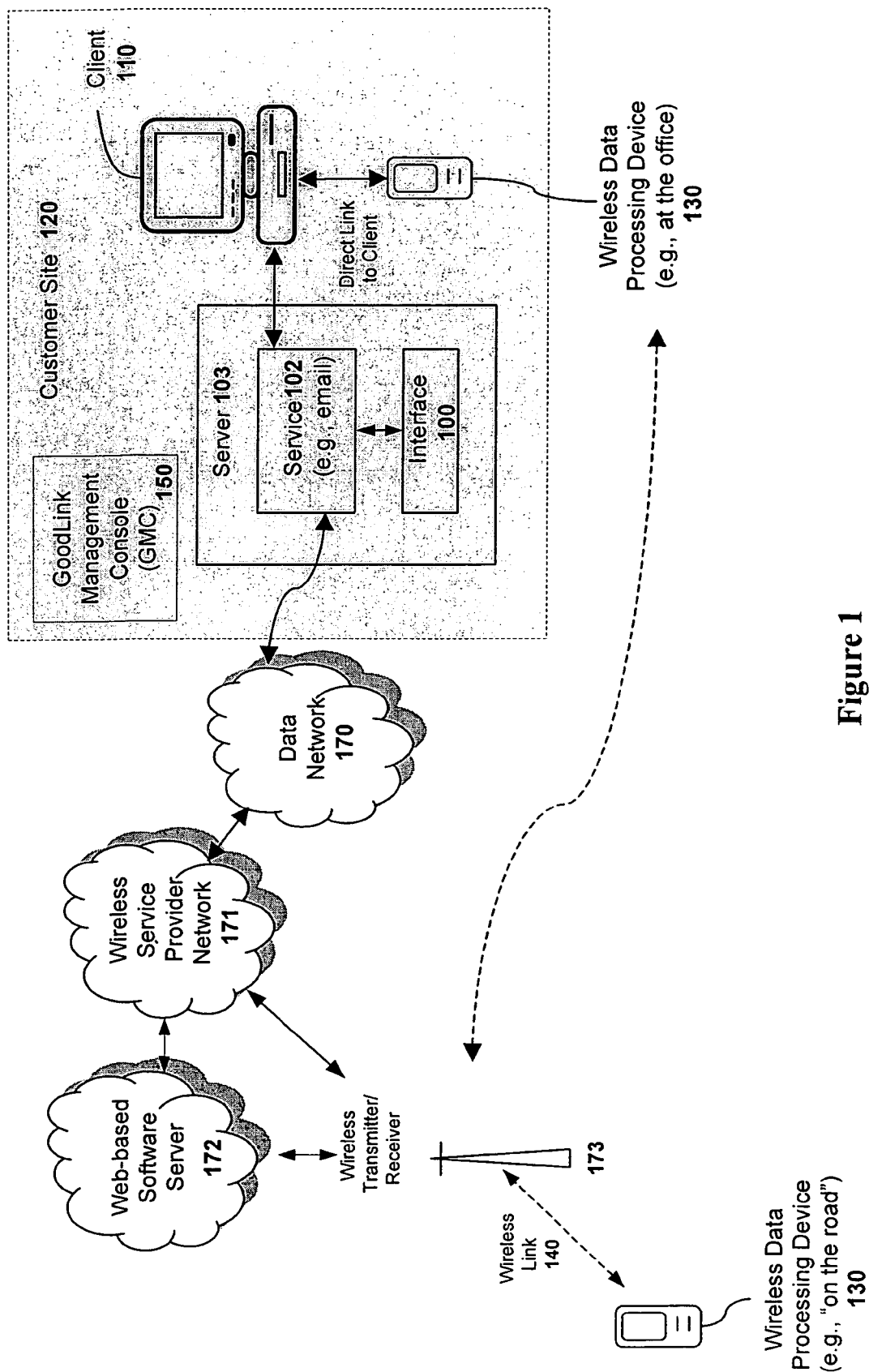
FIG. 1 illustrates one embodiment of a network.

FIG. 1 illustrates one embodiment of a network architecture. A "customer site" 120 is illustrated in FIG. 1 and may be any local-area or wide-area network over which a plurality of servers 103 and clients 110 communicate. For example, customer site 120 may include all servers and clients maintained by a single corporation.

Servers 103 may provide a variety of different messaging and groupware services 102 to network users (e.g., e-mail, instant messaging, calendaring, etc). In one embodiment, these services are provided by Microsoft Exchange.™ However, the underlying principles of the invention are not limited to any particular messaging/groupware platform.

In one embodiment, an interface 100 forwards data objects (e.g., e-mail messages, instant messages, calendar data, etc.) maintained by service 102 to a plurality of wireless data processing devices (represented in FIG. 1 by device 130) via an external data network 170 and/or a wireless service provider network 171. For example, if the service 102 includes an e-mail database, the interface 100 transmits any new e-mails, which arrive in a user's mailbox on the service 102 to the user's wireless data processing device 130 (over the network(s) 170 and/or 171).

Alternatively, or in addition, service 102 may provide the e-mail to the user's local computer (e.g., client 110) upon request (e.g., so that the user will receive the e-mail on his/her device 130 when out of the office and on his/her personal computer 110 when in the office). Conversely, e-mail messages transmitted from the user's wireless data processing device 130 are transmitted to the service 102 via the interface 100.

In one embodiment, interface 100 is a software module adapted to work with the particular service 102. It should be noted, however, that interface 100 may be implemented in hardware or any combination of hardware and software while still complying with the underlying principles of the invention.

In one embodiment, the external data network 170 includes a plurality of databases, servers/clients (not shown) and other networking hardware (e.g., routers, hubs, etc) for transmitting data between the interface 100 and the devices 130. In one embodiment, the interface 100 encapsulates data in one or more packets having an address identifying the devices 130 (e.g., such as a 24-bit Mobitex Access Number ("MAN #").

The external data network 170 transmits the packets to a wireless service provider network 171, which in turn, transmits the packets (or the data contained therein) over wireless communication link 173 (e.g. cell tower) to the device 130. In one embodiment, the wireless service provider network is a CDMA 2000 network. However, various other network types may be employed (e.g., Mobitex, GPRS, PCS, etc.) while still complying with the underlying principles of the invention.

It should be noted that the network service provider network 171 and the external data network 170 (and associated interface 100) may be owned/operated by the same organization or, alternatively, the owner/operator of the external data network 170 may lease wireless services from the wireless service provider network. The underlying principles of the invention are not limited to any particular service arrangement.

In one embodiment, customer site 120 includes a management console (MC) 150. In a further embodiment, MC 150 is a GoodLink™ management console (GMC) developed by Good Technology®. Further wireless service provider network 171 is connected to a web-based software server 172. In one embodiment, web-based software server 172 is a web-store, which is used to distribute updates and applications to wireless devices (e.g. device 130).

According to one embodiment, updates and/or applications for device 130 are transmitted to web-based software server 172 from wireless service provider network 171, which are available for download by device 130. In one embodiment, the application to be downloaded is GoodLink™ client developed by Good Technology®. In another embodiment, notification of the availability of updates and/or applications is transmitted to customer site 120. At customer site 120, MC 150 allows an administrator to assign software policies for device 130. In one embodiment, the software policies determine which update and/or application notifications device 130 will receive.

Based on the software policies, customer site 120 then transmits a message to device 130 notifying device 130 of the updates and/or applications that are available to be downloaded from web-based software server 172.

Figure 2:
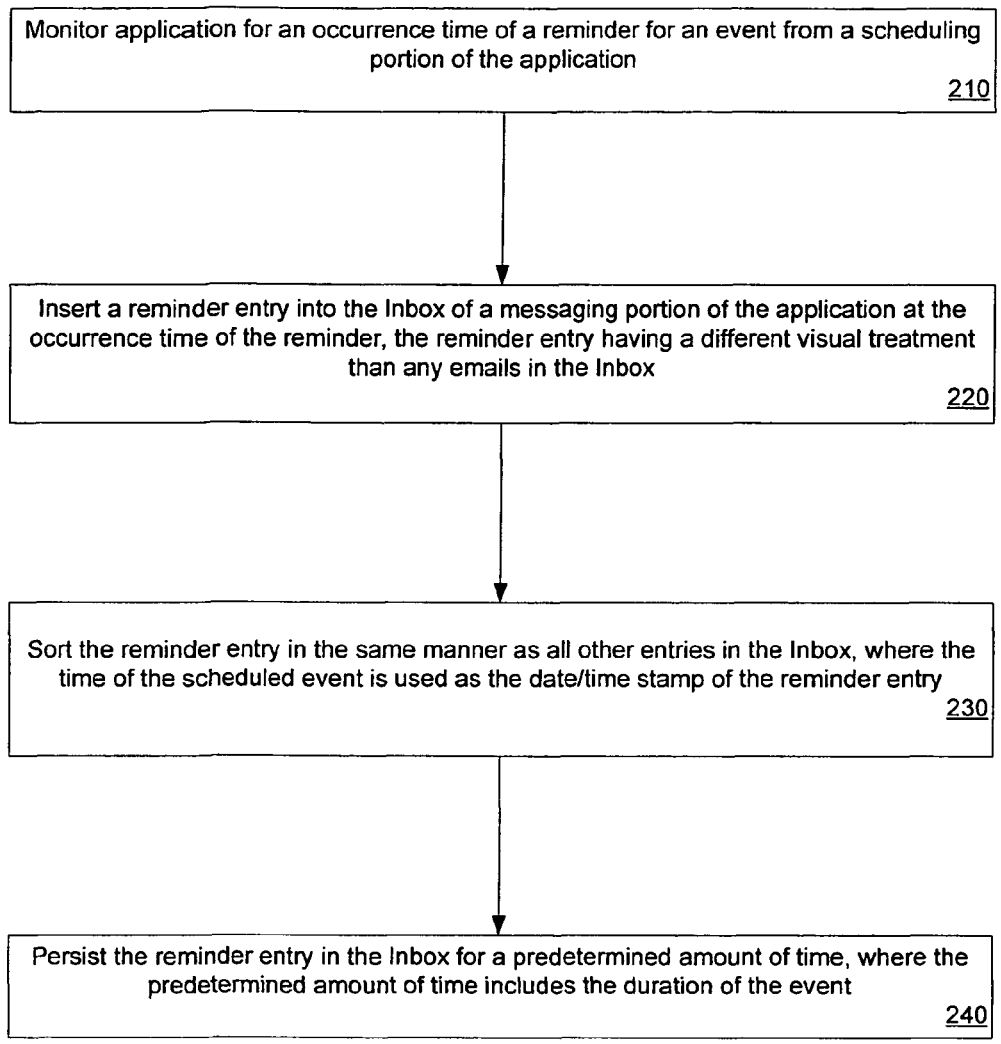
FIG. 2 is a flow diagram of a method according to one embodiment of the invention.

FIG. 2 is a flow diagram for a method 200 of one embodiment of meeting integration for a messaging and scheduling application. The messaging and scheduling application may be located and operate on any general computing device. However, in some embodiments, process 200 is performed by a scheduling application on a wireless messaging device, such as wireless processing device 130 of FIG. 1. For instance, embodiments may utilize a wireless messaging device having a Microsoft Outlook™ scheduling application that references a Microsoft Exchange™ server. Other embodiments may utilize a wireless messaging device having a Lotus Notes™ scheduling application that references a Lotus Domino™ server. One skilled in the art will appreciate that various messaging and scheduling applications and servers may be utilized.

Most users of wireless devices are frequent email users and often maintain the Inbox of their messaging application as the most visited screen when utilizing the wireless device. As such, process 200 provides one embodiment of a method to implement event reminders from a scheduling portion of a messaging and scheduling application in an Inbox of a messaging portion of such an application in a computing device.

Process 200 begins at processing block 210 where an application is monitored for an occurrence time of a reminder for an event from the scheduling portion of the application. For instance, in some embodiments, the application may be monitored for a pop-up reminder informing a user that a scheduled meeting is to occur in some pre-determined amount of time. In other embodiments, a reminder may not be used by the application and, in such a case, the scheduling portion of the application determines when a predetermined amount of time, such as a user-defined time, prior to a scheduled event occurs.

Then, at processing block 220, a reminder entry is inserted into the Inbox of a messaging portion of the application at the time of the reminder for the event from the scheduling portion of the application. The reminder entry is given a different visual treatment than other non-reminder entries in the Inbox, such as emails. This different visual treatment allows a user of the application to differentiate the reminder entry from other entries in the Inbox for quick identification. For instance, the reminder entry may have a unique icon associated with it. Oftentimes, emails in an Inbox include a letter icon; in some embodiments, reminder entries may have a clock icon. In addition, the reminder entry may be shaded a different color than other entries or utilize a different font color and type.

In some embodiments, selecting (e.g., clicking) the reminder entry in the Inbox will open the event entry from the scheduling portion of the application. This allows a user to quickly access pertinent information related to the event, such as date, time, location, and other participants. Such access of the event entry directly from the Inbox is useful in wireless devices, for example, as the Inbox is typically many users most frequently visited screen. A reminder entry in the Inbox eliminates time-consuming and inefficient navigation from the Inbox to the scheduling portion of the messaging and scheduling application in the device.

At processing block 230, the reminder entry is sorted in the same manner as all other entries in the Inbox. In some embodiments, the date/time stamp for the reminder entry is the date and time of the scheduled event even though it is inserted into the Inbox at the time the reminder occurs. In other embodiments, the time that the reminder entry was created may be used as the date/time stamp for the reminder entry. For example, when the reminder entry is inserted into the Inbox it is placed at the top of the Inbox as its most recent arrival. If the time of the scheduled event is the date/time stamp of the reminder entry, then the reminder entry will remain at the top of the Inbox until the time of the event passes.

However, when an email or another entry arrives with a date/time stamp after the date/time stamp of the reminder entry, the reminder entry will be moved down in the Inbox as it is no longer the most recent entry. For instance, in the case of the date/time stamp set as the scheduled event time, a reminder for a 2 pm meeting, that is set to remind a user at 1:45 pm, will appear at the top of the Inbox at 1:45 pm but with a date/time stamp of 2 pm. It will then remain at the top of the Inbox, with new emails arriving below it, until 2 pm. After 2 pm, new emails arriving will be sorted on top of the reminder entry and it will move downwards in the Inbox. In some embodiments, other sorting policies may be utilized by the Inbox other than date and time.

Finally, at processing block 240, the reminder entry persists in the Inbox for a predetermined amount of time until it is removed from the Inbox. For instance, the amount of time the reminder entry is maintained in the Inbox may be any time ranging from 1 hour to one day and beyond. This time may be a default time maintained by the application or a user-defined time. In some embodiments, this predetermined amount of time includes the duration of the event associated with the reminder entry. In other embodiments, a user may manually delete the reminder entry from the Inbox when the user determines it is no longer needed.

Figure 3:
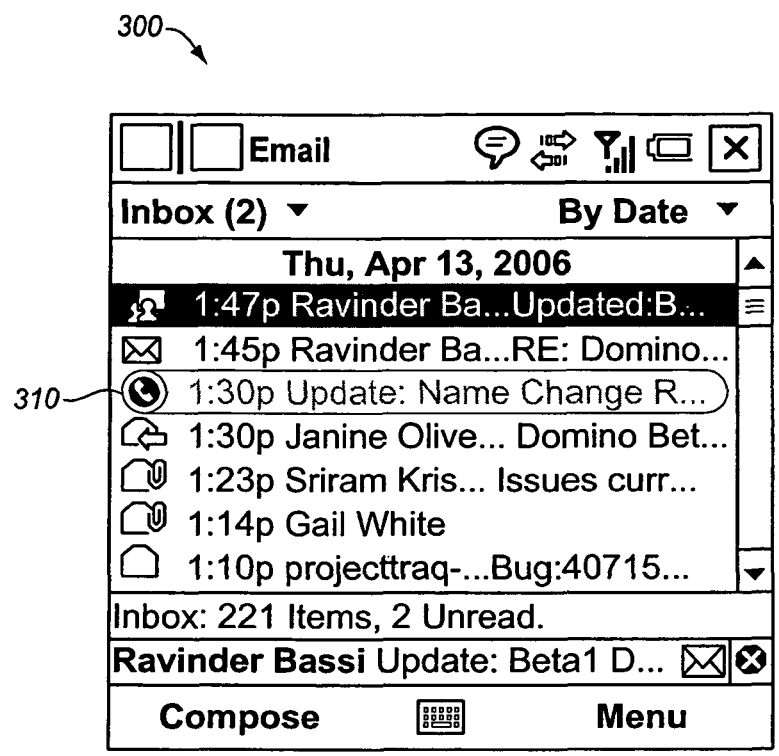
FIG. 3 is a screenshot of an embodiment of the invention.

FIG. 3 is a screenshot depicting meeting integration for a messaging and scheduling application according to one embodiment of the invention. In this screenshot, a screen 300 of a messaging and scheduling application is shown. Screen 300 depicts an Inbox of a messaging portion of the messaging and scheduling application. Screen 300 includes a reminder entry 310 that is created according to process 200 described with respect to FIG. 2.

As shown, reminder entry 310 has a different visual treatment than other entries in the Inbox. In addition, reminder entry 310 has been sorted in the same manner as the other entries in the Inbox. Reminder entry 310 has an associated time of 1:30 pm and is sorted according to most recent arrival time in the Inbox from top to bottom. Embodiments of the invention persist the reminder entry 310 in the Inbox for a predetermined amount of time including the duration of the event associated with reminder entry 310.

Figure 4:
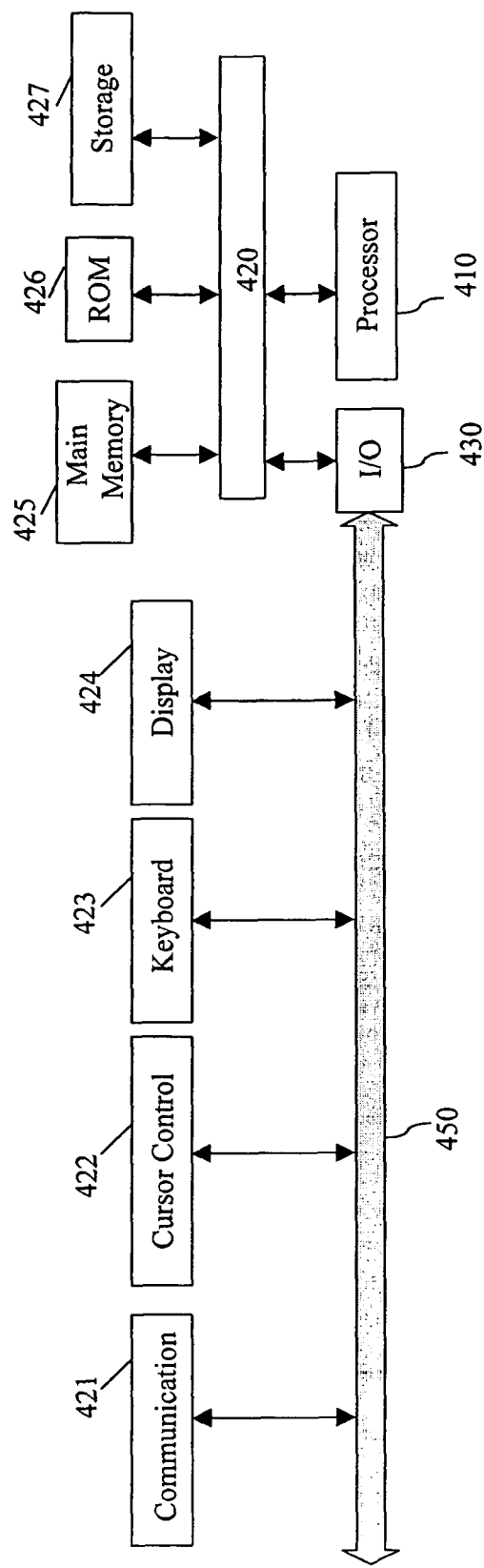
FIG. 4 illustrates one embodiment of a computer system.

FIG. 4 illustrates a computer system 400 on which method 200 may be implemented. Computer system 400 includes a system bus 420 for communicating information, and a processor 410 coupled to bus 420 for processing information. According to some embodiments, computer system 400 may be located on a wireless device, such as wireless data processing device 130 of FIG. 1.

Computer system 400 further comprises a random access memory (RAM) or other dynamic storage device 425 (referred to herein as main memory), coupled to bus 420 for storing information and instructions to be executed by processor 410. Main memory 425 also may be used for storing temporary variables or other intermediate information during execution of instructions by processor 410. Computer system 400 also may include a read only memory (ROM) and/or other static storage device 426 coupled to bus 420 for storing static information and instructions used by processor 410.

A data storage device 425 such as a magnetic disk or optical disc and its corresponding drive may also be coupled to computer system 400 for storing information and instructions. Computer system 400 can also be coupled to a second I/O bus 450 via an I/O interface 440. A plurality of I/O devices may be coupled to I/O bus 450, including a display device 424; an input device (e.g., an alphanumeric input device 423 and/or a cursor control device 422).

The communication device 421 is for accessing other computers (servers or clients) via a network. The communication device 421 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

The invention claimed is:

1. A method of presenting reminder entries on a wireless device, the method comprising:
    monitoring, at the wireless device, a scheduling portion of an application on the wireless device;
    detecting, at the wireless device, event data in the scheduling portion of the application on the wireless device;
    creating, at the wireless device, based on the detected event data, a reminder entry on the wireless device;
    displaying, at the wireless device, the reminder entry in an electronic mail inbox of a messaging portion of the application on the wireless device, the reminder entry indicating an upcoming occurrence of a scheduled event associated with the event data, and the reminder entry having a different visual treatment from an electronic mail message entry also displayed in the electronic mail inbox; and
    persisting the reminder entry in the electronic mail inbox of the messaging portion of the application on the wireless device for a predetermined amount of time.

2. The method of claim 1, further comprising: sorting the reminder entry in a same manner as all other entries in the electronic mail inbox.

3. The method of claim 2, wherein the sorting is based on date and time stamps of the entries in the electronic mail inbox, and wherein a date stamp and a time stamp of the reminder entry is set as a date and a time of the scheduled event associated with the reminder entry.

4. The method of claim 1, further comprising: opening a schedule entry associated with the scheduled event in the scheduling portion of the application on the wireless device when the reminder entry is selected in the electronic mail inbox, the schedule entry comprising at least one of: a date of the scheduled event, a time of the scheduled event, a location of the scheduled event, and a participant associated with the scheduled event.

5. The method of claim 1, wherein the reminder entry receives a different visual treatment from other non-reminder entries in the electronic mail inbox, including at least one of: a different icon, a different font color, a different font type, and a different shading type.

6. The method of claim 1, wherein the application is at least one of a Microsoft Outlook™ application or a Lotus Notes™ application.

7. The method of claim 1, wherein the predetermined amount of time is a duration of the scheduled event.

8. A non-transitory, computer-readable medium comprising computer-executable instructions that, when executed by a processor in a wireless device, cause the wireless device to perform a method, the method comprising:
    monitoring, at the wireless device, a scheduling portion of an application on the wireless device;
    detecting, at the wireless device, event data in the scheduling portion of the application on the wireless device;
    creating, at the wireless device, based on the detected event data, a reminder entry on the wireless device;
    displaying, at the wireless device, the reminder entry in an electronic mail inbox of a messaging portion of the application on the wireless device, the reminder entry indicating an upcoming occurrence of a scheduled event associated with the event data, and the reminder entry having a different visual treatment from an electronic mail message entry also displayed in the electronic mail inbox; and persisting the reminder entry in the electronic mail inbox of the messaging portion of the application on the wireless device for a predetermined amount of time.

9. The computer-readable medium of claim 8, wherein the method further comprises: sorting the reminder entry in a same manner as all other entries in the electronic mail inbox.

10. The computer-readable medium of claim 9, wherein the sorting is based on date and time stamps of the entries in the electronic mail inbox, and wherein a date stamp and a time stamp of the reminder entry is set as a date and a time of the scheduled event associated with the reminder entry.

11. The computer-readable medium of claim 8, wherein the method further comprises: opening a schedule entry associated with the scheduled event in the scheduling portion of the application on the wireless device when the reminder entry is selected in the electronic mail inbox, the schedule entry comprising at least one of: a date of the scheduled event, a time of the scheduled event, a location of the scheduled event, and a participant associated with the scheduled event.

12. The computer-readable medium of claim 8, wherein the method further comprises: monitoring the application for an occurrence of a reminder of the event from the scheduling portion of the application in order to determine when to insert the reminder entry in the electronic mail inbox.

13. The computer-readable medium of claim 8, wherein the reminder entry receives a different visual treatment from other non-reminder entries in the electronic mail inbox including at least one of: a different icon, a different font color, a different font type, and a different shading type.

14. The computer-readable medium of claim 8, wherein the predetermined amount of time is a duration of the scheduled event.

15. A wireless device comprising:
a display;
a memory comprising an application having a scheduling portion and a messaging portion;
a processor in data communication with the memory and configured to execute the application and to cause the wireless device to:
monitor the scheduling portion of the application;
detect event data in the scheduling portion of the application;
create, based on the detected event data, a reminder entry on the wireless device;
display the reminder entry in an electronic mail inbox of the messaging portion of the application, the reminder entry indicating an upcoming occurrence of a scheduled event associated with the event data, and the reminder entry having a different visual treatment from an electronic mail message entry also displayed in the electronic mail inbox; and
persist the reminder entry in the electronic mail inbox of the messaging portion of the application for a predetermined amount of time.

16. The wireless device of claim 15, wherein the processor is further configured to cause the wireless device to: open a schedule entry associated with the scheduled event in the scheduling portion of the application when the reminder entry is selected in the electronic mail inbox, the schedule entry comprising at least one of a date of the scheduled event, a time of the scheduled event, a location of the scheduled event, and a participant associated with the scheduled event.

17. The wireless device of claim 15, wherein the processor is further configured to cause the wireless device to: monitor for an occurrence of a reminder of the scheduled event from the scheduling portion of the application in order to determine when to insert the reminder entry in the electronic mail inbox.

18. The wireless device of claim 15, wherein the reminder entry is visually distinct from other non-reminder entries in the electronic mail inbox, and includes at least one of: a different icon, a different font color, a different font type, and a different shading type.

19. The wireless device of claim 15, wherein the processor is further configured to cause the wireless device to: sort the reminder entry in a same manner as all other entries in the electronic mail inbox, based on date and time stamps of the entries in the electronic mail inbox, and wherein a date and time stamp of the reminder entry is set as a date and time of the scheduled event associated with the reminder entry.

20. The wireless device of claim 15, wherein the application is at least one of a Microsoft Outlook™ application or a Lotus Notes™ application.

21. The wireless device of claim 15, wherein the predetermined amount of time is a duration of the scheduled event.

* * * * *